(12) United States Patent
Boykin et al.

(10) Patent No.: US 7,512,590 B2
(45) Date of Patent: Mar. 31, 2009

(54) DISCOVERY DIRECTIVES

(75) Inventors: James R. Boykin, Pflugerville, TX (US); Alberto Giammaria, Austin, TX (US); Brian J. Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/425,463

(22) Filed: Jun. 21, 2006

(65) Prior Publication Data
US 2008/0127188 A1     May 29, 2008

(51) Int. Cl.
*G06F 7/00*     (2006.01)
*G06F 17/30*     (2006.01)

(52) U.S. Cl. .......................................... 707/2
(58) Field of Classification Search ........... 707/2
See application file for complete search history.

(56) References Cited

U.S. PATENT DOCUMENTS

| | | | |
|---|---|---|---|
| 6,195,676 B1* | 2/2001 | Spix et al. .................... | 718/107 |
| 6,236,983 B1 | 5/2001 | Hofmann et al. | |
| 7,139,811 B2* | 11/2006 | Lev Ran et al. ............. | 709/217 |
| 2003/0009540 A1 | 1/2003 | Benfield et al. | |
| 2005/0047350 A1 | 3/2005 | Kantor et al. | |

FOREIGN PATENT DOCUMENTS

WO     WO 02/05184 A2     1/2002

OTHER PUBLICATIONS

"All About IBM Tivoli Configuration Manager Version 4.2", IBM Corporation, Dec. 2002, http://www.redbooks.ibm.com/redbooks/pdfs/sg246612.pdf, pp. i-xxv and 345-516.
"Operations Guide: Microsoft Systems Management Server 2003", Microsoft Corporation, 2003, http://www.e-consultancy.com/knowledge/whitepapers/88549/operations-guide-microsoft-systems-management-server-2003-scalable-management-for-windows-based-systems.html, 69 pages.
Troin, Philippe, "Manpages CRON/CRONTAB", Dec. 20, 1993, http://www.fifi.org/cgi-bin/man2html/usr/share/man/man1/crontab.1.gz, 9 pages.

* cited by examiner

*Primary Examiner*—Hosain T Alam
*Assistant Examiner*—Van H Ngo
(74) *Attorney, Agent, or Firm*—Stephen R. Tkacs; Stephen J. Walder, Jr.; Jeffrey S. LaBaw (57) ABSTRACT

A mechanism for configuring and scheduling logical discovery processes in a data processing system is provided. A discovery engine communicates with information providers to collect discovery data. An information provider is a software component whose responsibility is to discover resources and relationships between the resources and write their representations in a persistent store. Discovery directives are used to coordinate the execution of information providers.

3 Claims, 7 Drawing Sheets

FIG. 4A
```
// Definition of the SoftwareProduct resource to be discovered
[Provider("SoftwareProvider")]
class SoftwareProduct : CIM_ManagedSystemElement
{
    [Key]
    string Name;
    [Key]
    string Version;
    string InstallationDirectory;
    datetime InstallationDateTime;
};
```

FIG. 4B
```
// Definition of Discovery Directive
class DiscoveryDirective
{
    // Specifies the name of this discovery directive
    string Name;
    // Specifies the name of classes of resources to discover
    string ClassNames[];
    // Specifies the schedule associated with the discovery process
    schedule schedule;
};
```

FIG. 4C
```
// Definition of Schedule
class Schedule
{
    // Specifies when to start the discovery process
    datetime StartTime;
    // Specifies when to stop the discovery process
    datetime EndTime;
    // Specifies the interval to use to refresh the information
    // discovered by the discovery process
    datetime Interval;
};
```

FIG. 4D
```
// Definition of the Software Discovery Directive
class SoftwareDiscoveryDirective : DiscoveryDirective
{
    string FileExtensions[];
    string Drive;
};
```

FIG. 5A
```
// Directive specified by Administrator Luigi
instance of SoftwareDiscoveryDirective as $LuigiDirective
{
        Name           = "Luigi's directive";
        Classes        = "SoftwareProduct";
        FileExtensions = {"exe", "bat"};
        Drive          = "C:";
        Schedule       = $LuigiSchedule;
};
```

FIG. 5B
```
// Schedule used by Administrator Luigi
instance of Schedule as $LuigiSchedule
{
        Name      = "Luigi's schedule";
        StartTime = "10/7/2004 12:00 PM";
        EndTime   = "12/25/2004 12:00 PM";
        Interval  = "6 hours";
};
```

FIG. 5C
```
// Directive specified by Administrator Mario
instance of SoftwareDiscovery Directive as $MarioDirective
{
        Name           = "Mario's directive";
        Classes        = "SoftwareProduct";
        FileExtensions = {"exe", "dll"};
        Drive          = "C:";
        Schedule       = $MarioSchedule;
};
```

FIG. 5D
```
//Schedule used by Administrator Mario
instance of Schedule as $MarioSchedule
{
        Name      = "Mario's schedule";
        StartTime = "10/8/2004 12:00 PM";
        EndTime   = "12/31/2004 12:00 PM";
        Interval  = "12 hours";
};
```

*FIG. 7A*

```
interface Provider {
        ProviderExecutionPlan[] createExecutionPlan(DiscoveryDirective[] directives);
        void prepareInstances(ProviderExecutionPlan plan);
        void invalidateInstances(ProviderExecutionPlan plan);
}
```

*FIG. 7B*

```
class DiscoveryDirective {
        string getName() {...};
        string[] getClassNames() {...};
        schedule getSchedule() {...};
}
```

*FIG. 7C*

```
class Schedule {
        long getStartTime() {...};
        long getEndTime() {...};
        long getInterval() {...};
};
```

*FIG. 7D*

```
class ProviderExecutionPlan {
        string[] getClassNames() {...};
        schedule getschedule() {...};
        string getSatisfiedDiscoveryDirectiveName() {...};
}
```

FIG. 8A
```
instance of SoftwareDiscoveryDirective
{
    Name            ="New Software Discovery Directive";
    Classes         ="SoftwareProduct";
    // note the merged file extensions
    FileExtensions  = {"exe", "bat", "dll"};
    Drive           = "C:";
    Schedule        = $Newschedule;
};
```

FIG. 8B
```
instance of Schedule as $NewSchedule
{
    Name        = "New schedule";
    // min start time of the two schedules
    StartTime   = "10/7/2004 12:00 PM";
    // max end time of the two schedules
    EndTime     = "12/31/2004 12:00 PM";
    // min interval of the two schedules
    Interval    = "6 hours";
};
```

DISCOVERY DIRECTIVES

BACKGROUND

1. Technical Field

The present application relates generally to an improved data processing system and method. More specifically, the present application is directed to a method, apparatus, and computer program product for configuring and scheduling discovery processes in a data processing system.

2. Description of Related Art

"Discovery", in the field of system management, is the capability of automatically identifying hardware or software services in a network. For example, an administrator may wish to discover scanners, printers, Web servers, or particular software applications. Discovery systems either use central depositories where services are registered, or they provide a method for querying devices on the network.

Administrators may be in charge of network resources, license management, or software solutions distribution. Administrators typically request discovery scans; however, scans may also be initiated by software products. A scan can dominate resources for a significant amount of time. For example, a software scan may access hard disk drives and use processor resources on a number of data processing systems concurrently for a substantial period of time. Therefore, configuration and scheduling of discovery scans must be practical. That is, it is beneficial for administrators to schedule discovery processes so that the scans do not interfere with the production of workers or the computing devices themselves.

The discovery processes in current discovery engines are usually configured by parameters that delimit the set of resources to discover and define the time intervals used to scan the monitored resources again. A range of Internet protocol (IP) addresses may be used to delimit network discovery, while a drive specification may be used to delimit application discovery.

Different administrators may have different needs for discovery configuration parameters. If two or more administrators want to share the same discovery engine, they may agree on a common set of configuration parameters. If administrators cannot agree on a common set of configuration parameters, they may install two or more discovery engines and configure them separately.

Sharing the same configuration parameters among different administrators requires continued agreement. Any time one of the administrators needs to change parameters for a specific purpose, it may increase unnecessarily increase the burden on other scanned networks and systems that share the configuration parameters. For example, if an administrator needs to scan a small subnet each hour and another administrator needs to scan a large subnet each day, a common configuration would require scanning the combined subnets each hour. On the other hand, using multiple independent discovery engines in the same network increases the likelihood that overlapping scans of the same regions or resources may occur.

SUMMARY

The illustrative embodiments recognize the disadvantages of the prior art and provide a mechanism for configuring and scheduling logical discovery processes in a data processing system. A discovery engine communicates with information providers to collect discovery data. An information provider is a software component whose responsibility is to discover resources and relationships between the resources and write their representations in a persistent store. Discovery directives are used to coordinate the execution of information providers.

In one illustrative embodiment, a method in a data processing system for configuring and scheduling logical discovery processes in a data processing system comprises receiving a plurality of discovery directives. Each discovery directive within the one or more discovery directives defines classes of resources and relationships to be discovered. The method further comprises creating an optimized provider execution plan to satisfy the plurality of discovery directives and to minimize overlapping discovery. Further, the method comprises executing the provider execution plan.

In one exemplary embodiment, the provider execution plan comprises a plurality of directive/schedule pairs. In another exemplary embodiment, executing the provider execution plan comprises creating a job for each directive/schedule pair within the plurality of directive/schedule pairs to form a plurality of jobs and passing the plurality of jobs with associated schedule information to a scheduler. In a further exemplary embodiment, executing the provider execution plan further comprises instructing the information provider to create instances of resource objects. The information provider discovers resource information defined in the provider execution plan and stores the resource information in a persistent store. In yet another embodiment, executing the provider execution plan further comprises, responsive to a given job within the plurality of jobs completing, generating an event to indicate directives associated with the given job are satisfied.

In another exemplary embodiment, a discovery controller receives the one or more discovery directives. The discovery controller passes the one or more discovery directives to an information provider. The information provider creates the provider execution plan. In a further embodiment, the discovery controller optimizes the execution plan.

In another illustrative embodiment, an apparatus in a data processing system for configuring and scheduling logical discovery processes in a data processing system is provided. The apparatus comprises a discovery controller and an information provider. The discovery controller receives one or more discovery directives. Each discovery directive within the one or more discovery directives defines classes of resources and relationships to be discovered. The discovery controller passes the one or more discovery directives to the information provider. The information provider creates a provider execution plan to satisfy the one or more discovery directives and wherein the provider execution plan comprises one or more directive/schedule pairs. The discovery controller executes the provider execution plan.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to receive one or more discovery directives. Each discovery directive within the one or more discovery directives defines classes of resources and relationships to be discovered. The computer readable program may further cause the computing device to create a provider execution plan to satisfy the one or more discovery directives and wherein the provider execution plan comprises one or more directive/schedule pairs. The computer readable program may still further cause the computing device to execute the provider execution plan.

In other exemplary embodiments, the computer readable program may cause the computing device to perform various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
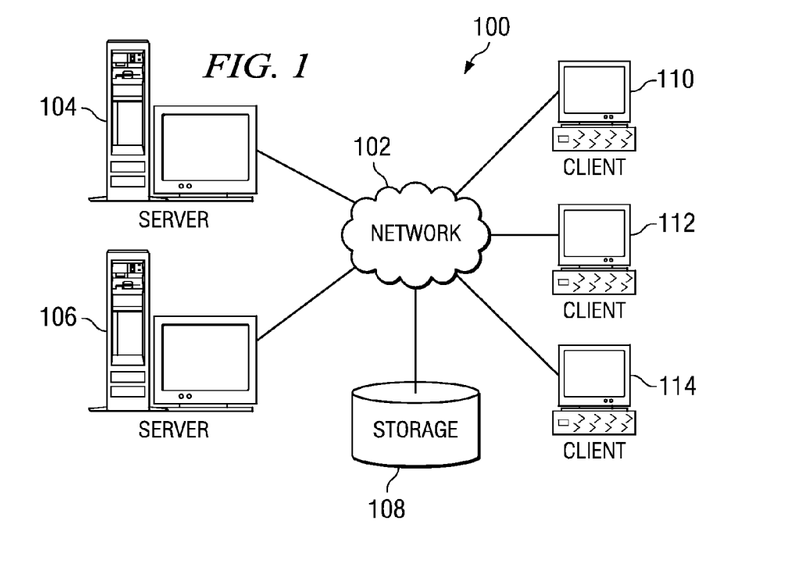
FIG. 1 depicts a pictorial representation of an exemplary distributed data processing system in which aspects of the illustrative embodiments may be implemented.
Figure 2:
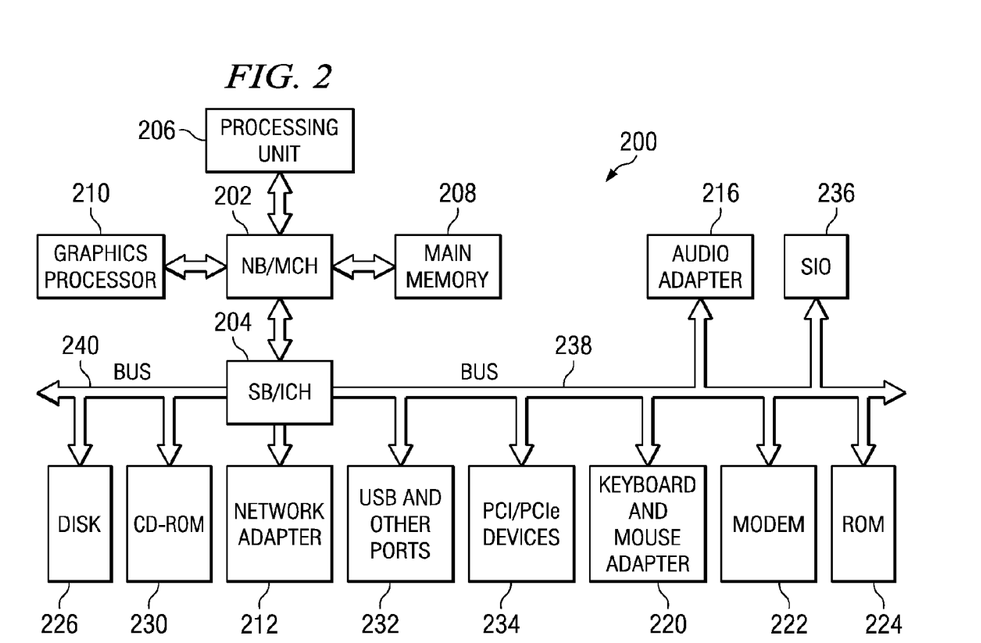
FIG. 2 is a block diagram of an exemplary data processing system in which aspects of the illustrative embodiments may be implemented.

The illustrative embodiments described hereafter provide a mechanism for configuring and scheduling logical discovery processes in a data processing system. As such, the illustrative embodiments may be implemented in a distributed data processing environment in which multiple computing devices are utilized along with one or more data networks. Accordingly, FIGS. 1 and 2 hereafter are provided as examples of a distributed data processing environment and computing devices in which exemplary aspects of the illustrative embodiments may be implemented. FIGS. 1 and 2 are only exemplary and are not intended to state or imply any limitation with regard to the types and/or configurations of computing devices in which the illustrative embodiments may be implemented. Many modifications to the computing devices and environments depicted in FIGS. 1 and 2 may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In one illustrative embodiment, distributed data processing system 100 includes resources to be discovered by an administrator during a discovery scan. For example, a network administrator may wish to scan network 102 for routers, switches, and the like. As another example, a software solutions distribution manager may wish to scan clients 110, 112, 114, or even servers 104 and 106, for particular software applications. In the illustrative embodiment, multiple administrators may configure different logical discovery processes on the same discovery engine while, at the same time, avoiding the likelihood of concurrent overlapping scans on the same systems.

A discovery engine may run on a server, such as servers 104, for instance. The discovery engine communicates with information providers to collect discovery data. An information provider is a software component whose responsibility is to discover resources and relationships between the resources and write their representations in a persistent store. Discovery directives are used to coordinate the execution of information providers and specify the classes of information to be discovered, how frequently to run the discovery scans, on which resources to run the scans, among other discovery parameters.

A client application, which may run on one of clients 110, 112, 114, for example, passes discovery directives to the discovery engine. A client application may submit discovery directives under the instruction of a human operator, such as a system administrator, for example. Alternatively, a client application may submit discovery directives automatically under control of the program. For example, a license software application may periodically discover software applications that are no longer covered by a software license. The discovery engine reads discovery directives and generates execution plans that satisfy the discovery directives. The client application then listens for events indicating when the requested classes of information are discovered and then reads or otherwise collects the discovered information from resource instances created by discovery engine.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
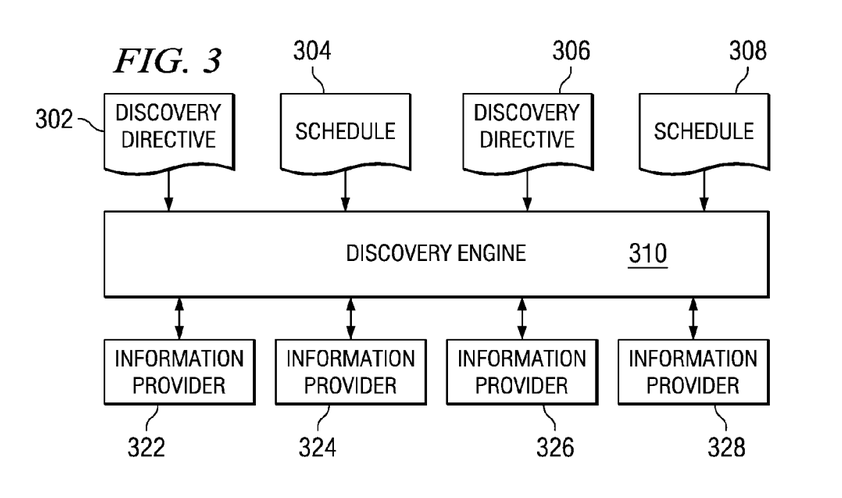
FIG. 3 is a block diagram illustrating a discovery system in accordance with an exemplary embodiment.

FIG. 3 is a block diagram illustrating a discovery system in accordance with an exemplary embodiment. Discovery engine 310 receives discovery directive 302 and schedule 304 from a first administrator or client application. Discovery engine 310 may be embodied on a server, such as server 104 in FIG. 1, for example. Discovery engine 310 also receives discovery directive 306 and schedule 308 from a second administrator or client application. Discovery engine 310 communicates with information providers 322, 324, 326, 328 to collect discovery data.

Figure 4A:
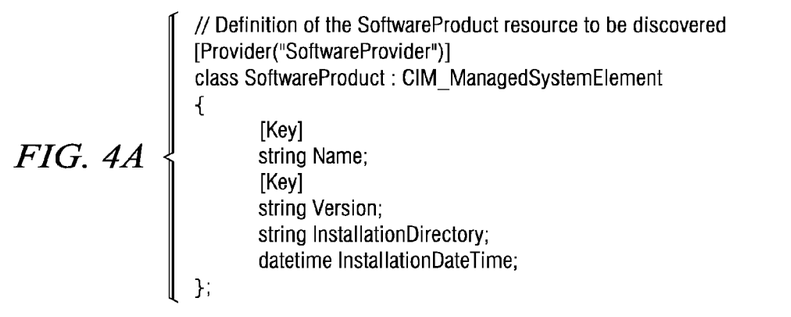
FIG. 4A depicts an example resource class definition for a software resource to be discovered in accordance with an illustrative embodiment.

An information provider is a software component whose responsibility is to discover resources and relationships between the resources and write their representations in a persistent store. FIG. 4A depicts an example resource class definition for a software resource to be discovered in accordance with an illustrative embodiment. In the definition shown in FIG. 4A, the Provider qualifier refers to the class that implements the provider logic.

In the example depicted in FIG. 3, the discovery of resources is governed by discovery directives 302, 306, which are used to coordinate the execution of information providers 322, 324, 326, 328. A discovery directive is composed of a "what" parameter and a "when" parameter. A "what" parameter defines classes of resources and relationships to be discovered. A "when" parameter defines the schedule according to which the provider is to run.

Usually, depending on the resource class, a discovery directive may contain other configuration parameters. A "where" parameter delimits the area to scan. A "how" parameter provides constraints for the scan, such as processor usage, network bandwidth usage, and the like. The "where" and "how" parameters are usually class dependent.

As an example, a network discovery directive may contain the following parameters:
what: IPAddress
when: StartTime=10/10/04 18:00, EndTime=12/31/04 0:00, Interval=1 hour
where: IP-address range(9.48.25.47-9.48.25.250)

As another example, a software discovery directive may contain the following parameters:
what: SoftwareProduct
when: StartTime=10/20/04 6:00, EndTime=12/25/04 0:00, Interval=1 hour
where: InstallationDrive=C:, D:

The examples shown in FIGS. 4A-4D are in the common information model, managed object format (CIM/MOF) programming language. However, a person of ordinary skill in the art will recognize that discovery directives, as well other components of the discovery system, may be implemented using other programming languages without departing from the spirit and scope of the present invention.

Figure 4B:
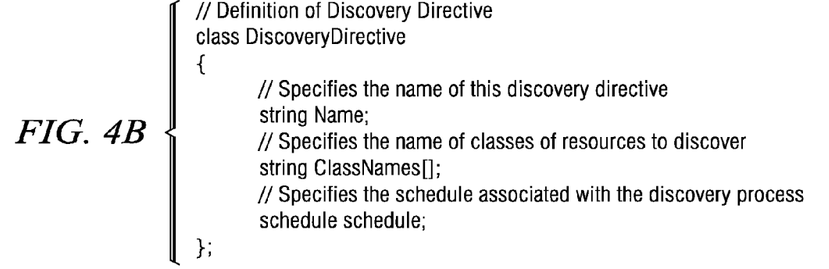
FIG. 4B depicts an example a discovery directive class definition in accordance with an illustrative embodiment.
Figure 4C:
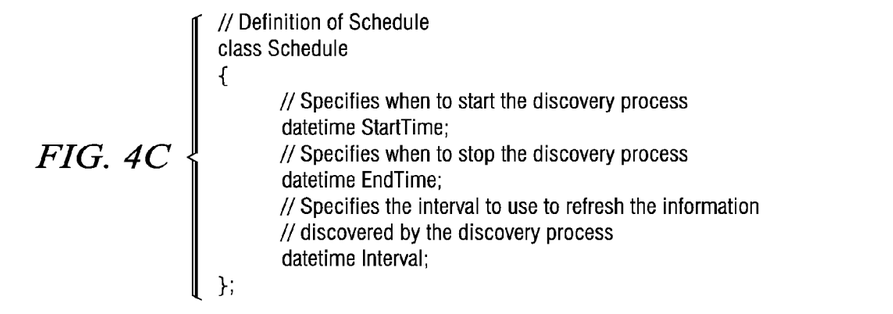
FIG. 4C depicts an example schedule class definition in accordance with an illustrative embodiment.

FIG. 4B depicts an example discovery directive class definition in accordance with an illustrative embodiment. The discovery directive specifies the name of the discovery directive, the name of the classes of resources to be discovered, and when to run the information provider. As can be seen in the example depicted in FIG. 4B, the "when" parameter of a discovery directive may be specified by reference to a schedule class. FIG. 4C depicts an example schedule class definition in accordance with an illustrative embodiment. In the example depicted in FIG. 4C, the schedule specifies when to start the discovery process, when to stop the discovery process, and the interval to use to refresh the information discovered by the discovery process.

Figure 4D:
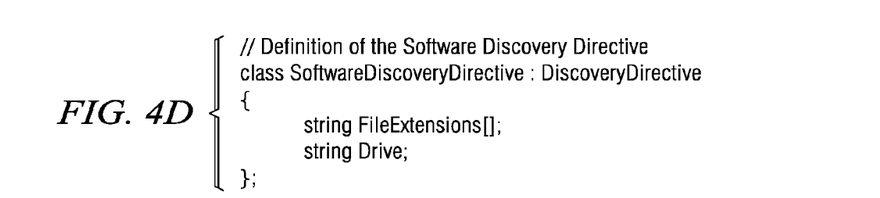
FIG. 4D is an example specialized software discovery directive class definition in accordance with an illustrative embodiment.

Discovery directives may be specialized to address the needs of certain resource classes. For example, discovery directives may be specialized for network discovery, software product discovery, and so forth. FIG. 4D is an example specialized software discovery directive class definition in accordance with an illustrative embodiment. As can be seen in the example depicted in FIG. 4D, the specialized software discovery directive class defines the class of resources to be discovered as file extensions and delimits the area to scan to a particular drive.

Figure 5A:
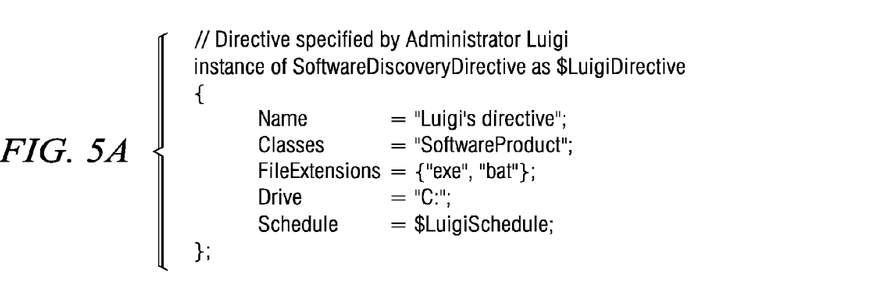
FIGS. 5A-5D depict examples of discovery directive classes and schedule classes for different administrators in accordance with an exemplary embodiment.
Figure 5B:
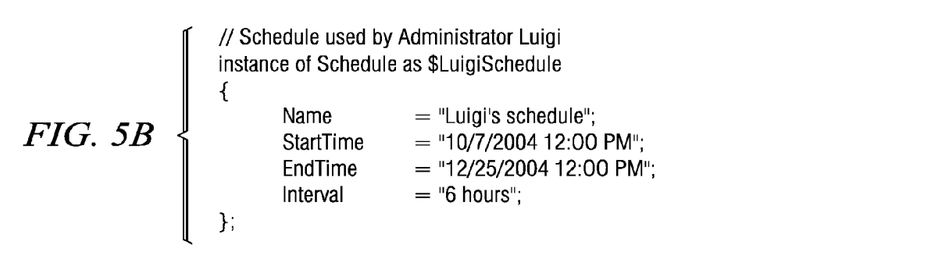

FIGS. 5A-5D depict examples of discovery directive classes and schedule classes for different administrators in accordance with an exemplary embodiment. Considering this particular example for illustration, a first administrator, Luigi, sets a discovery directive for the SoftwareProduct class. FIG. 5A depicts the discovery directive specified by Luigi, where the name of the directive is "Luigi's directive," the classes of resources to be scanned are defined as "SoftwareProduct," the file extensions to be scanned are "exe" and "bat," the drive to which the scan is to be limited is "C:", and the schedule is "$LuigiSchedule." FIG. 5B depicts the schedule used by Luigi, where the name of the schedule is "Luigi's schedule," the start time is defined as "10/7/2004 12:00 PM," the end time is defined as "12/25/2004 12:00 PM," and the interval is defined as "6 hours."

Figure 5C:
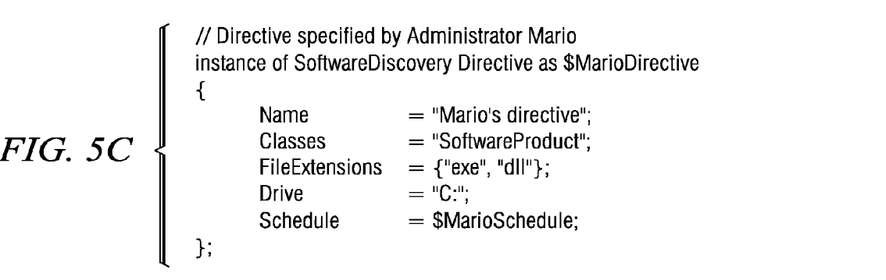
Figure 5D:
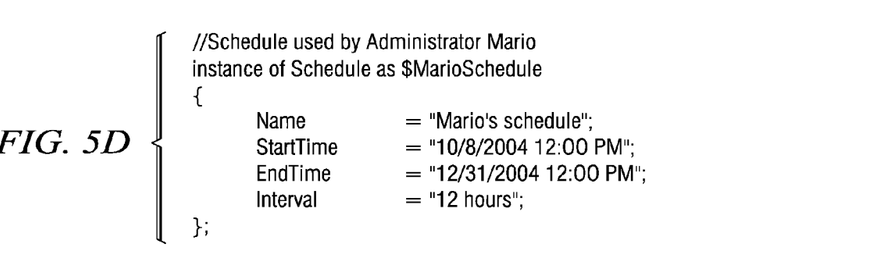

Now consider a second administrator, Mario, sets a different discovery directive for the same resource class. FIG. 5C depicts the discovery directive specified by Mario, where the name of the directive is "Mario's directive," the classes of resources to be scanned are defined as "SoftwareProduct," the file extensions to be scanned are "exe" and "dll," the drive to which the scan is to be limited is "C:", and the schedule is "$MarioSchedule." FIG. 5D depicts the schedule used by Mario, where the name of the schedule is "Mario's schedule," the start time is defined as "10/8/2004 12:00 PM," the end time is defined as "12/31/2004 12:00 PM," and the interval is defined as "12 hours."

The examples shown in FIGS. 5A-5D are in the common information model, managed object format (CIM/MOF) programming language. However, a person of ordinary skill in the art will recognize that discovery directives, as well other components of the discovery system, may be implemented using other programming languages without departing from the spirit and scope of the present invention.

Figure 6:
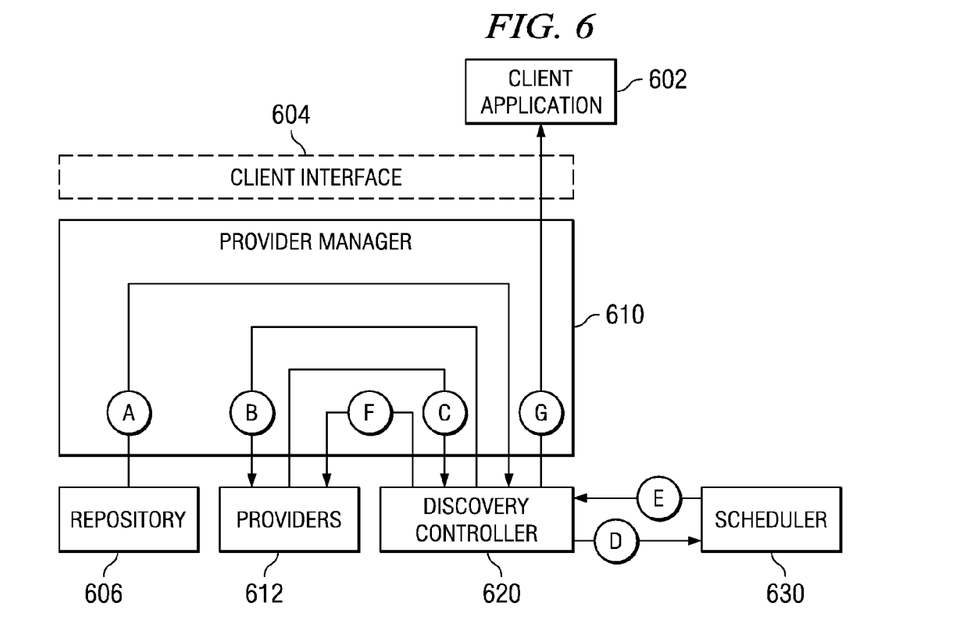
FIG. 6 is a block diagram of a discovery engine in accordance with an illustrative embodiment.

FIG. 6 is a block diagram of a discovery engine in accordance with an illustrative embodiment. Discovery controller 620 reads discovery directives from repository 606. Discovery controller 620 generates execution plans that satisfy the discovery directives and passes the execution plans to scheduler 630 for the execution of information providers 612.

Execution plans generated by the discovery controller may differ from those of an information provider. Optimization could occur at discovery controller rather than information provider. With the division of labor between the discovery controller and the information provider, one could actually have multiple discovery controllers providing requests to the same information provider. One situation where it might be valuable is where different network administrators are responsible for different parts of the network and, hence, it makes the most sense, most of the time, for the discovery operations to be separate. However, there may be relatively few events in the portion of the network under another administrator's control on which it would be useful to collect information. Thus, perhaps, it would be useful to have the ability for the local discovery controller to send a request to an information provider in the other network.

Figure 7A:
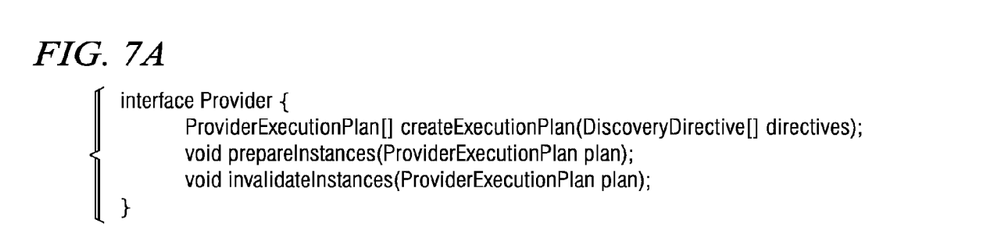
FIG. 7A depicts an example interface that the information provider class may implement in accordance with an illustrative embodiment.

FIG. 7A depicts an example interface that the information provider class may implement in accordance with an illustrative embodiment. In the embodiment, using the Java™ programming language, an information provider may be any class that implements the interface shown by example in FIG. 7A. In the depicted examples, interfaces, classes, and instances are shown using the Java™ programming language for illustration purposes; however, a person of ordinary skill in the art will appreciate that the interfaces, classes, and instances may be written in other programming languages without departing from the spirit and scope of the present invention. The method createExecutionPlan returns one or more execution plans for the passed directives. The method prepareInstances discovers the resources defined in the passed execution plan and stores them in a persistent store.

The method invalidateInstances invalidates the resources specified in the passed execution plans.

Figure 7B:
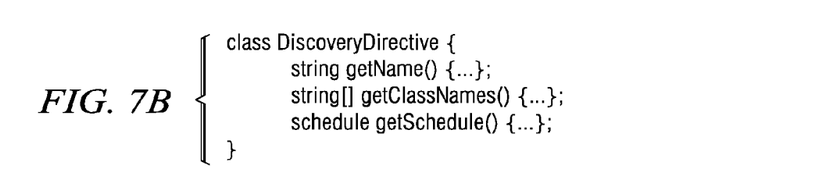
FIG. 7B depicts an example discovery directive class in accordance with an illustrative embodiment.

FIG. 7B depicts an example discovery directive class in accordance with an illustrative embodiment. The method getName returns the name of the discovery directive. The method getClassNames returns the names of the classes of resources to discover. The method getSchedule returns the schedule associated with the discovery process.

Figure 7C:
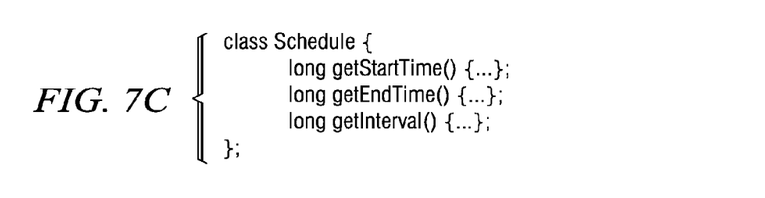
FIG. 7C depicts an example schedule class in accordance with an illustrative embodiment.

FIG. 7C depicts an example schedule class in accordance with an illustrative embodiment. The method getStartTime returns the start time of the discovery process. The method getStopTime returns the stop time of the discovery process. The method getInterval returns the interval to use to refresh the values of the discovered resources.

Figure 7D:
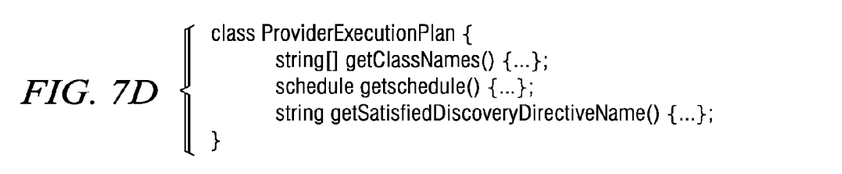
FIG. 7D depicts an example provider execution plan class in accordance with an illustrative embodiment.

FIG. 7D depicts an example provider execution plan class in accordance with an illustrative embodiment. The method getNewDiscoveryDirective returns an optimized new discovery directive that meets the requirements of one or more original discovery directives (see getSatisfiedDiscoveryDirectiveNames). The method getSatisfiedDiscoveryDirectiveNames returns the name of the original discovery directive satisfied by the execution plan.

Returning to FIG. 6, in step A, the operation of discovery controller 620 reads all specified discovery directives from repository 606. Discovery controller 620 then resolves class dependencies and class/provider dependencies. For example, a directive specifying a class that is part of a system may be expanded into a directive that contains the original class, the class representing the system, and an association that links one to the other. This is because a part cannot exist without the system that contains it. Likewise, an association class may be expanded into the original class and the classes that are referenced by the association.

Discovery controller 620 also handles directives among different providers if a directive specifies classes that are handled by different providers. For instance, a directive specifying both a ComputerSystem class (handled by a system information provider) and a SoftwareProduct class (handled by a software information provider) may be split into two directives, one specifying the ComputerSystem class for the system information provider and another one specifying the SoftwareProduct class for the software information provider.

In step B, discovery controller 620 passes the newly generated directives to the proper information provider's createExecutionPlans method. The responsibility of this method is to decide the best strategy to satisfy both directives using a minimum amount of resources. For example, a software information provider may decide to merge the extensions of the file to scan because looking for another file extension (to satisfy a second directive) adds a negligible amount of work. Providers 612 return the provider execution plan in step C.

Figure 8A:
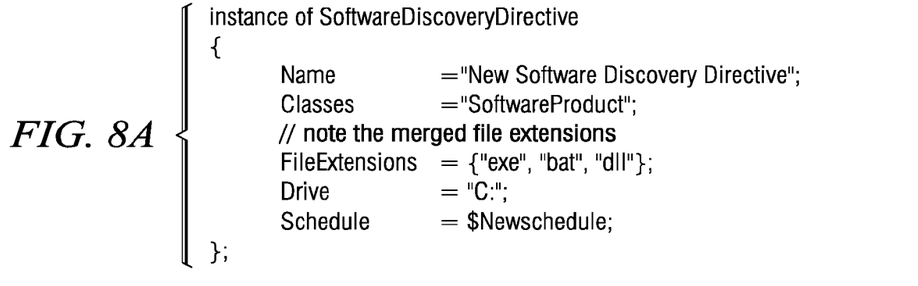
FIGS. 8A and 8B depict an instance of a discovery directive and schedule resulting from merging discovery directives in accordance with an exemplary embodiment.
Figure 8B:
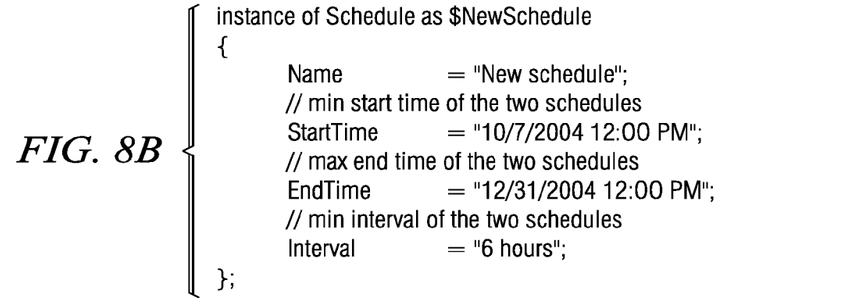

As an example, suppose the software information provider decides to merge the discovery directives specified in FIGS. 5A-5D. The createExecutionPlans method will return a single directive. FIGS. 8A and 8B depict an instance of a discovery directive and schedule resulting from merging discovery directives in accordance with an exemplary embodiment. As seen in FIG. 8A, the file extensions to be scanned are merged. As shown in FIG. 8B, the schedule sets a minimum start time of the two schedules, a maximum end time of the two schedules, and a minimum interval of the two schedules. The new directive/schedule pair satisfies both Luigi's and Mario's original directives. This combination of three items—new directive, new schedule, and satisfied original directive—may be referred to as ProviderExecutionPlan.

The examples shown in FIGS. 8A and 8B are in the common information model, managed object format (CIM/MOF) programming language. However, a person of ordinary skill in the art will recognize that discovery directives, as well other components of the discovery system, may be implemented using other programming languages without departing from the spirit and scope of the present invention.

Alternatively, the software provider may decide not to merge the directives and pass the original directive/schedule pairs back to the discovery controller. In this case, the content of the discovery directive instances and schedule instances for different administrators will be identical to those shown in FIGS. 5A-5D.

With reference again to FIG. 6, in step D, discovery controller 620 creates a job for each returned directive/schedule pair and passes the jobs with their associated schedule information to scheduler 630. In turn, scheduler 630 runs these jobs according to the specified schedule. The job's run method calls a discovery controller method in step E, which in turn calls the prepareInstances method of providers 612 in step F. Note that discovery controller 620 may never look inside the schedules. Rather, discovery controller 620 only passes directives and schedules among providers 612 through provider manager 610 and scheduler 630. This allows changing scheduler 630 without changing code in discovery controller 620.

"Instances" prepared by a provider are representations of the resources being scanned. Entities, such as software applications, may listen (subscribe) to events to determine when the instances are prepared. An instance may comprise properties of the resource being represented. For example, an instance of a software product to be scanned may include values for the properties of that software product, such as name, version, installation directory, and installation date and time, which correspond to the properties defined in the class illustrated in FIG. 4A. These entities may then query (consume) the instances to obtain the scan information.

When a job is completed successfully, discovery controller 620 generates, or "fires," an event (DirectivesSatisfiedEvent) indicating that the job's associated directives are satisfied. Discovery controller 620 may fire a DirectivesSatisfiedEvent event for each directive specified by a provider execution plan. Discovery controller 620 also fires events (InstancesPreparedEvent) indicating that the instances of requested classes are ready to be queried by client application 602 in step G.

Discovery controller 620 passes to scheduler 630 jobs to invalidate instances when the end time of the schedule arrives. The job's run method calls a discovery controller method that in turn calls the provider's invalidateInstances method. When the jobs complete successfully, the controller fires InstanceInvalidated events.

Client application 602 passes discovery directives to discovery controller 620, listens for events indicating when the requested classes of information are discovered, and then reads the discovered information from the place where the information is stored. For instance, client application 602 may be interested in knowing when instances of SoftwareProduct are prepared. Client application 602 may then connect to client interface 604 and add a listener specifying the following filters: eventClassName=InstancesPreparedEvent, targetClassName=SoftwareProduct. If client application 602 is interested in when an entire directive is satisfied, it connects to client interface 604 to add a listener specifying the following filters: eventClassName=DirectivesSatisfiedEvent, targetClassName=SoftwareDiscoveryDirective. When the event is received, client application 602 may query the instance of the classes that are ready, using query methods enumerateInstances, references (enumerateAssociations), and associators (enumerateAssociatedObjects) of client interface 604.

Figure 9:
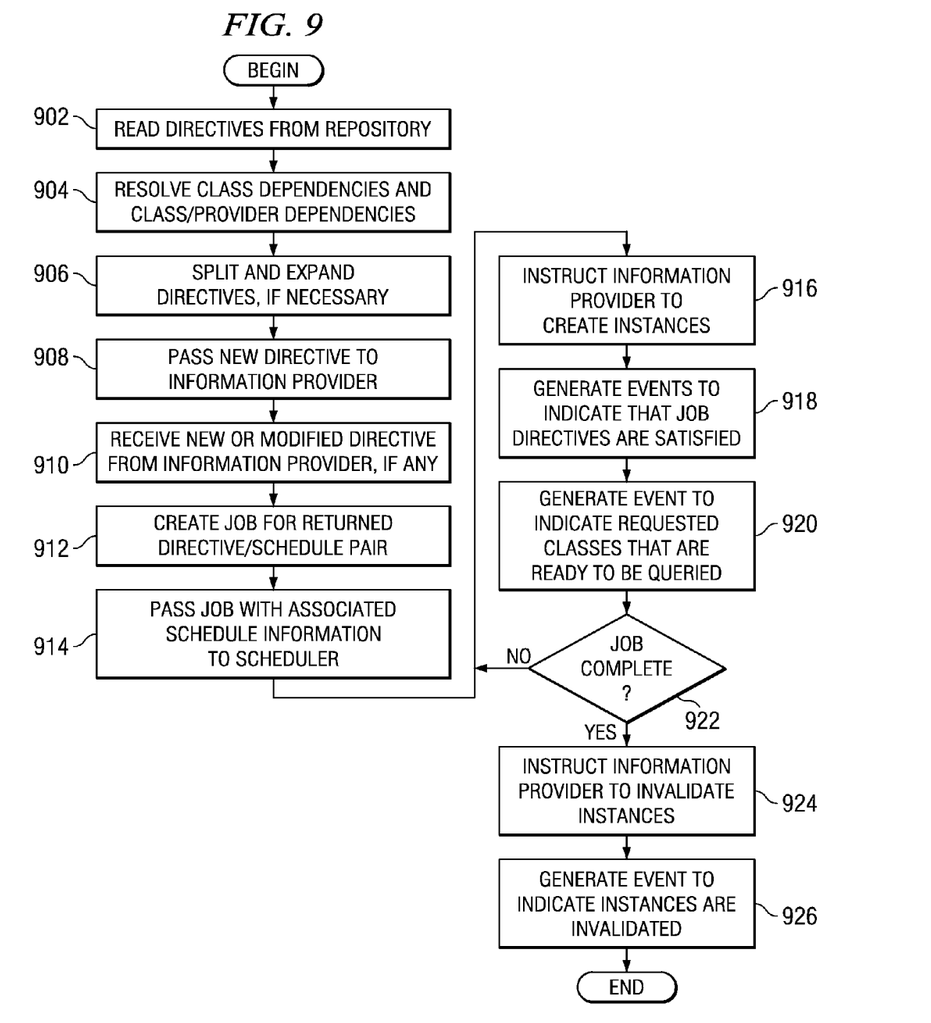
FIG. 9 is a flowchart illustrating operation of a discovery controller in accordance with an illustrative embodiment.

FIG. 9 is a flowchart illustrating operation of a discovery controller in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 9, operation begins and the discovery controller reads discovery directives from a repository (block 902). The discovery controller resolves class dependencies and class/provider dependencies (block 904). The discovery controller splits and expands discovery directives, if necessary (block 906).

Next, the discovery controller passes the new directives to information providers (block 908). Directives may be passed to information providers via the method Provider.createExecutionPlan described above, for example. The discovery controller then receives new or modified directives from information providers, if any (block 910). Thereafter, the discovery controller creates jobs for the returned directive/schedule pairs (block 912) and passes the jobs with associated schedule information to a scheduler (block 914). Operation then proceeds to block 916 where the discovery controller then instructs the information providers to create instances. The discover controller may instruct information providers to create instances via the method Provider.prepareInstances described above, for example.

The discovery controller generates events to indicate that the job's directives are satisfied and that the requested classes are ready to be queried (blocks 918 and 920). Thereafter, the discovery controller determines whether the job is complete (block 922). If the job is complete, operation returns to block 916 to instruct the information provider to create instances.

If the job is complete in block 922, the discovery controller instructs the information provider to invalidate instances (block 924). The discovery controller may instruct the information provider to invalidate instances using the method Provider.invalidateInstances as described above, for example. Then, the discovery controller generates an event to indicate that instances are invalidated (block 926), and operation ends. There are situations where data are volatile. Invalidating the instances ensures that consumers do not read scan data that are incorrect, or invalid.

Figure 10:
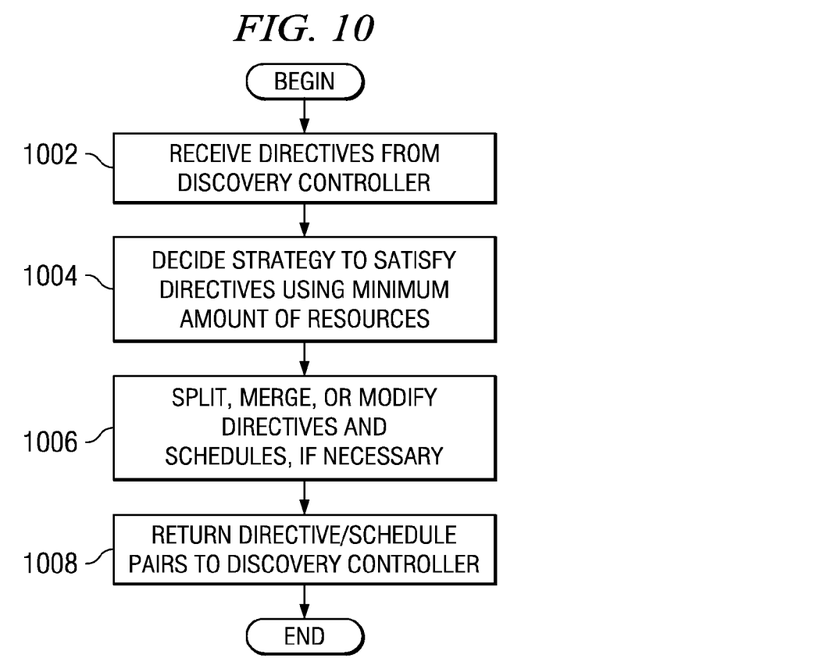
FIG. 10 is a flowchart illustrating operation of an information provider in accordance with an illustrative embodiment.

FIG. 10 is a flowchart illustrating operation of an information provider in accordance with an illustrative embodiment. Operation begins and the information provider receives directives from the discovery controller (block 1002). The information provider decides a strategy to satisfy directives using a minimum amount of resources (block 1004). The information provider splits, merges, or modifies directives and schedules, if necessary (block 1006). The information provider returns the directive/schedule pairs to the discovery controller (block 1008). Thereafter, operation ends.

Thus, the illustrative embodiments solve the disadvantages of the prior art by providing a mechanism for configuring and scheduling logical discovery processes in a data processing system. A discovery engine communicates with information providers to collect discovery data. An information provider is a software component whose responsibility is to discover resources and relationships between the resources and write their representations in a persistent store. Discovery directives are used to coordinate the execution of information providers.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for configuring and scheduling logical discovery processes in a data processing system, the method comprising:
   receiving a plurality of discovery directives, wherein each discovery directive within the plurality of discovery directives defines classes of resources and relationships to be discovered;
   creating an optimized provider execution plan to satisfy the plurality of discovery directives and to minimize overlapping discovery, wherein the optimized provider execution plan comprises a plurality of directive/schedule pairs; and
   executing the optimized provider execution plan,
   wherein a discovery controller receives the one or more discovery directives;
   wherein the discovery controller passes the one or more discovery directives to an information provider;
   wherein the information provider creates a provider execution plan;
   wherein the discovery controller optimizes the execution plan to form the optimized provider execution plan; and
   wherein executing the optimized provider execution plan comprises:
      creating a job for each directive/schedule pair within the plurality of directive/schedule pairs to form a plurality of jobs;
      passing the plurality of jobs with associated schedule information to a scheduler;
      instructing the information provider to create instances of resource objects, wherein the information provider discovers resource information defined in the optimized provider execution plan and stores the resource information in a persistent store; and
      responsive to a given job within the plurality of jobs completing, generating an event to indicate directives associated with the given job are satisfied.

2. An apparatus in a data processing system for configuring and scheduling logical discovery processes in a data processing system, the apparatus comprising:
   a discovery controller;
   an information provider; and
   a scheduler,
   wherein the discovery controller receives a plurality of discovery directives, wherein each discovery directive within the plurality of discovery directives defines classes of resources and relationships to be discovered;
   wherein the discovery controller passes the plurality of discovery directives to the information provider, wherein the information provider creates a provider execution plan to satisfy the plurality of discovery directives, and wherein the provider execution plan comprises a plurality of directive/schedule pairs;
   wherein the discovery controller executes the provider execution plan; and
   wherein executing the optimized provider execution plan comprises:
      creating a job for each directive/schedule pair within the plurality of directive/schedule pairs to form a plurality of jobs;
      passing the plurality of jobs with associated schedule information to a scheduler;
      instructing the information provider to create instances of resource objects, wherein the information provider discovers resource information defined in the optimized provider execution plan and stores the resource information in a persistent store; and
      responsive to a given job within the plurality of jobs completing, generating an event to indicate directives associated with the given job are satisfied.

3. A computer program product comprising a computer useable medium having a computer readable program, wherein the computer readable program, when executed on a computing device, causes the computing device to:
   receive plurality of discovery directives, wherein each discovery directive within the plurality of discovery directives defines classes of resources and relationships to be discovered;
   create an optimized provider execution plan to satisfy the one or more discovery directives and wherein the optimized provider execution plan comprises one or more directive/schedule pairs, wherein the optimized provider execution plan comprises a plurality of directive/schedule pairs; and
   execute the provider execution plan,
   wherein a discovery controller receives the one or more discovery directives;
   wherein the discovery controller passes the one or more discovery directives to an information provider;
   wherein the information provider creates a provider execution plan;
   wherein the discovery controller optimizes the execution plan to form the optimized provider execution plan; and
   wherein executing the optimized provider execution plan comprises:
      creating a job for each directive/schedule pair within the plurality of directive/schedule pairs to form a plurality of jobs;
      passing the plurality of jobs with associated schedule information to a scheduler;
      instructing the information provider to create instances of resource objects, wherein the information provider discovers resource information defined in the optimized provider execution plan and stores the resource information in a persistent store; and
      responsive to a given job within the plurality of jobs completing, generating an event to indicate directives associated with the given job are satisfied.

* * * * *